POWER TOOL

Original Filed Nov. 16, 1967 6 Sheets-Sheet 1

INVENTOR
DOUGLAS H. PETERSON

BY [signature]
ATTORNEYS

INVENTOR

DOUGLAS H. PETERSON

POWER TOOL

Original Filed Nov. 16, 1967

INVENTOR

DOUGLAS H. PETERSON

Sept. 15, 1970 D. H. PETERSON 3,528,510

POWER TOOL

Original Filed Nov. 16, 1967 6 Sheets-Sheet 4

INVENTOR

DOUGLAS H. PETERSON

INVENTOR

DOUGLAS H. PETERSON

INVENTOR
DOUGLAS H. PETERSON

United States Patent Office 3,528,510

Patented Sept. 15, 1970

3,528,510

POWER TOOL

Douglas H. Peterson, New York, N.Y., assignor to Mohawk Designers, Inc., Utica, N.Y., a corporation of New York Original application Nov. 16, 1967, Ser. No. 683,717. Divided and this application May 28, 1969, Ser. No. 828,501

Int. Cl. B23q *5/06;* F16d *3/06*

U.S. Cl. 173—148 19 Claims

ABSTRACT OF THE DISCLOSURE

The power tool includes a spindle mounted for rotation and axial sliding movement within a tool housing. The spindle is frictionally slidable within a sleeve which in turn is ball splined within an opening formed in a drive gear. A fluid actuated motor is coupled to rotate the gear. The spindle frictionally slides relative to the sleeve for torque loads below a predetermined torque load with the sleeve and spindle being jointly axially displaceable on the ball spline for torque loads greater than the predetermined torque load.

This application is a division of copending application, Ser. No. 683,717, filed Nov. 16, 1967.

BACKGROUND OF THE INVENTION

The present invention relates generally to a power operated tool and more specifically to a fluid actuated multi-purpose tool for setting nuts, driving screws, tapping holes, and the like particularly for use in the preparation and assembly of machine parts.

In many industries, particularly the automotive, truck and farm implement fields, there are many fasteners to be driven for assembling the components of such machines, such as engines, transmissions, differentials, etc. Moreover, the parts forming such components must be machined to proper size and shape and preassembled before final assembly of the components. This entails driving various fastening devices to clamp the parts during machining, as well as driving the fasteners employed for both preassembly and final assembly. An ever-present problem is the design and manufacture of equipment which will drive fasteners of various types, tap holes, etc., to facilitate assembly of the various parts forming the machine component, as well as driving those fasteners used in final assembly.

Conventional systems for machining and assembling the various parts forming the machine components and for final assembly of such components are known. Such systems often employ fluid actuated motors mounted on angle plates which, in turn, are mounted on guides, slides and bearings, or the like. Drive motors or cylinders are provided to move the assemblage to and from the work. The control and actuation of such systems are rather complicated, expensive, awkward, and, in general, entirely unsatisfactory. Moreover, the parts cost of these systems, as well as the time required to design such systems, borders at unacceptable limits.

DESCRIPTION OF THE PRESENT INVENTION

The present invention comprises a power tool including two basic elements: A fluid actuated motor for driving a spindle in rotation and a fluid actuated piston for advancing the spindle axially such that a work tool or head mounted on the end of the spindle is moved toward and into engagement with the work. Basically, pressure fluid is supplied to a fluid actuated motor which rotates a spindle through a reduction gearing, the spindle being splinedly mounted for axial movement. A fluid actuated cylinder having a piston rotatably mounting the inner end of the spindle is axially aligned in end-to-end relation with the spindle. Pressure fluid is provided to the motor and cylinder to simultaneously rotate the spindle and drive the piston and spindle axially to advance the head toward the work. In one form hereof, a spring is provided for automatically retracting the spindle from the work when the pressure fluid is cut off. In another form hereof, the spindle is retracted by applying fluid pressure to a cylinder return port.

The stall torque developed covers a wide range and is variable by adjusting the input air pressure to the motor, whereby the rotary forces applied by the work head of the spindle may be varied as required in a particular application. The spindle may be driven in opposite rotary directions by supplying pressure fluid to one or the other of a pair of ports. The power tool hereof may be mounted on either the front or bottom surfaces and, in this manner, provides for ready and easy mounting thereof adjacent the work. Since actuation of the power tool drives the head into engagement with the work, the tool may be fixedly mounted, thereby eliminating the slides, guides, etc., previously necessary to locate fastening machines in position to engage the work.

It is a feature of one form of the invention hereof that the direction of rotation of the spindle may be reversed after a predetermined axial displacement of the spindle and that the pressure fluid to the piston and cylinder is simultaneously cut off whereby the spindle is automatically retracted from the work. To accomplish this, a stop ring is adjustably mounted on the piston rod which projects from the rear of the tool housing. The stop ring engages a valve after predetermined axial displacement of the piston. The valve shifts to cut off pressure fluid from the cylinder and to provide pressure fluid to the motor for driving the same in the opposite direction. This permits the power tool hereof to tap and bore holes, etc., to a predetermined depth or axial position. The stop ring may also actuate other switches at any predetermined position of piston travel and thus it is possible to signal remotely that certain machine functions are accomplished and to initiate other machine functions.

In another form hereof, means are provided to detect that the motor torque has exceeded a predetermined torque. To this end, the fluid motor per se, including the casing thereof, is rotatably mounted in the power tool housing. The motor casing is releasably restrained from rotation whereby the motor drives the spindle. The force restraining the motor casing from rotation is counterbalanced by a spring preloaded to a predetermined value. Accordingly, as the reaction torque of the motor casing exceeds the spring loading, the casing rotates against the bias of the spring to actuate a switch which provides a control signal indicating that the applied torque exceeds the predetermined torque.

Still another form of the power tool of the present invention provides a spindle and cylinder encased as a unit and releasably mounting a fluid motor which rotates the spindle. A separate fluid supply is provided the cylinder for driving the spindle axially. This arrangement permits various types of fluid motors having different operating characteristics to be employed interchangeably.

A still further form hereof virtually eliminates the frictional resistance to axial displacement of the spindle during rotation thereof for high reaction torque values and provides for a substantially friction free axial displacement of the rotating spindle. To this end, the spindle is splined or mounted in a square socket in a sleeve which, in turn, is interconnected for rotation within a fluid motor driven gear by a plurality of roller bearings carried in axially extending, radially registering grooves formed on the sleeve and gear. The sleeve is spring biased to a retracted position and otherwise free for axial movement. Thus, when friction between the spindle and sleeve retards or prevents axial movement of the spindle relative to the sleeve as when a high torque is developed particularly upon engagement of the tool with the work, the spindle and sleeve are displaced axially as a unit rolling along the substantially friction free axially aligned bearings.

Accordingly, it is an object of the present invention to provide an improved power tool for driving fasteners, tapping holes, and the like.

It is another object of the present invention to provide a multi-purpose power tool for driving fasteners, tapping holes and the like which is dependable, inexpensive, and rugged in use.

It is still another object of the present invention to provide a multi-purpose power tool for driving fasteners, tapping holes, and the like, which may be fixedly mounted mounted with the work head thereof being simultaneously rotated and driven forwardly to engage the work.

It is yet another object of the present invention to provide a multi-purpose fluid motor actuated power tool for driving fasteners, tapping holes, and the like, wherein the fluid motor is releasably mounted providing ready and easy interchangeability with other fluid motors.

It is a further object of the present invention to provide a multi-purpose power tool for driving fasteners, tapping holes, and the like, having a rotatably driven spindle which feeds forwardly to engage the work and which direction of rotation may be reversed and the spindle automatically retracted in response to a predetermined forward displacement of the spindle.

It is still a further object of the present invention to provide a multi-purpose power tool for driving fasteners, tapping holes, and the like, having means for detecting that the motor torque exceeds a predetermined torque.

It is still a further object of the present invention to provide a multi-purpose power tool for driving fasteners, tapping holes, and the like, having a rotatably driven spindle which feeds forwardly substantially free of friction at high torque loads as when the tool engages the work.

These and further objects and advantages of the present invention will become more apparent upon reference to the following specification, claims and appended drawings.

DESCRIPTION OF THE DRAWING FIGURES

DESCRIPTION OF A PREFERRED EMBODIMENT

Figure 2:
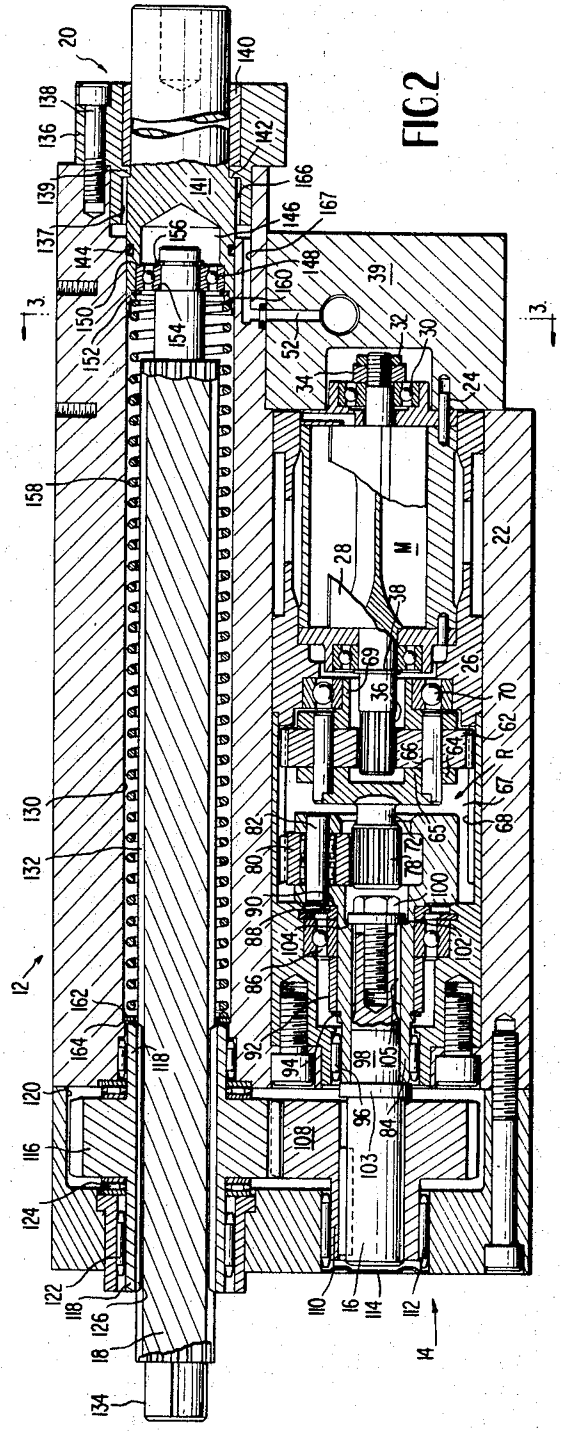
FIG. 2 is an enlarged longitudinal section view thereof.
Figure 1:
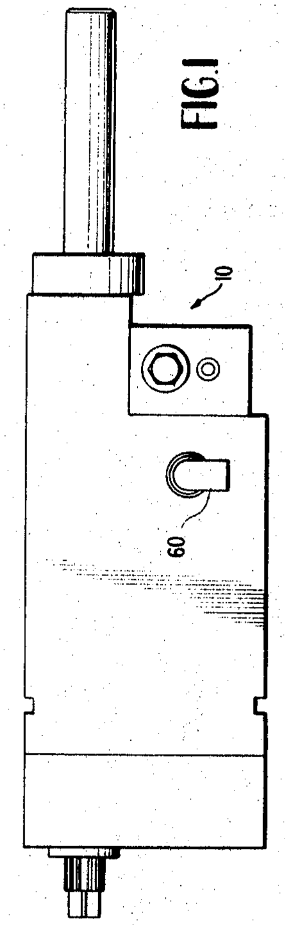
FIG. 1 is a side elevational view of a power tool constructed in accordance with the present invention.

Referring now to FIGS. 1 and 2, the power tool is generally illustrated at 10 and comprises upper and lower housing sections 12 and 14, respectively, suitably secured together by means not shown. Lower section 14 houses a fluid actuated motor M which drives a shaft 16 through reduction gearing generally indicated R, shaft 16 being geared to a spindle 18 rotatably mounted in upper section 12. Spindle 18 is axially displaced by a fluid actuated piston and cylinder arrangement generally indicated at 20.

Motor M may comprise any suitable fluid actuated motor and includes an outer casing 22 fixed to housing section 14 as by pin 24 and journalling a shaft 26 at opposite ends of the casing as by suitable bearings 30, shaft 26 mounting the usual sliding vanes 28. One end of shaft 26 is threaded to receive a retaining nut and washer 32 and 34, respectively, washer 34 bearing against the inner race of bearings 30 to prevent axial displacement of shaft 26 to the left as seen in FIG. 2. The opposite end of shaft 26 is axially extended and gear teeth 36 are formed thereon for engagement with the gears of reduction gearing R shaft 26 carrying a radial flange 38 inwardly of geared end 36 which bears against the inner race of the bearing 30 at the opposite end of motor casing 22 to prevent axial displacement of shaft 26 to the right as seen in FIG. 2.

Figure 3:
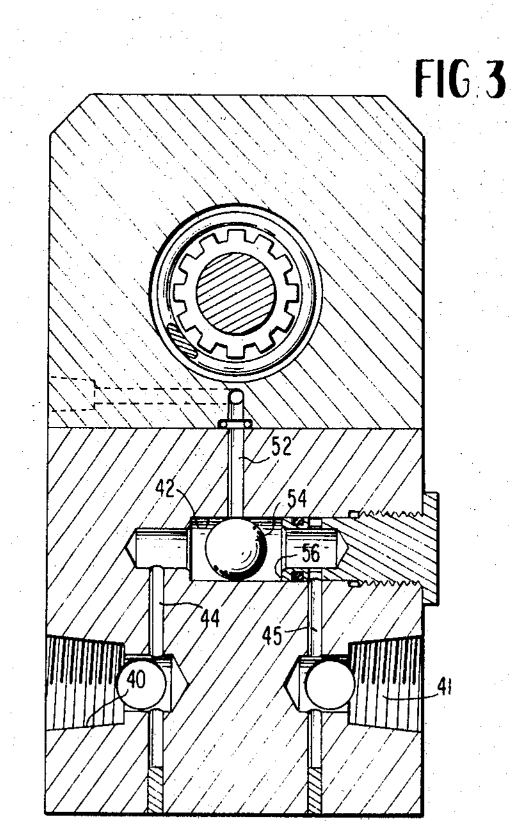
FIG. 3 is an enlarged transverse sectional view taken about on line 3—3 of FIG. 2.
Figure 4A:
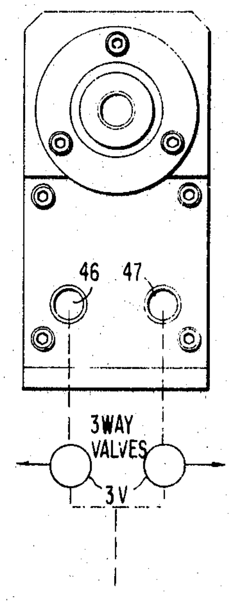
FIGS. 4A and 4B are reduced end elevational views looking from right to left in FIG. 2 and illustrating alternate fluid control systems.
Figure 4B:
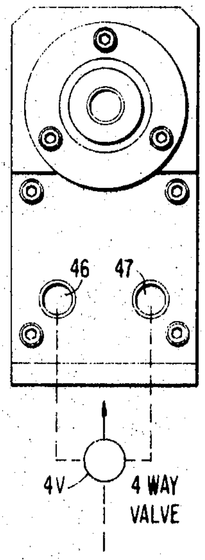

As seen in FIGS. 2 and 3, a block 39 is suitably secured to the end of housing section 14 and below section 12 and has a pair of laterally opening ports 40 and 41 which communicate with a central cylindrical chamber 42 through opposite ends of the latter via respective passages 44 and 45, and, as seen in FIGS. 4A and 4B, a pair of end ports 46 and 47 are also provided and respectively communicate with passages 44 and 45. A pair of passages, not shown, connect between respective ports 40 and 41 and motor M and open through a pair of ports, not shown, in casing 22, whereby air supplied to either port 40 or 41 drives motor M alternately in forward or reverse directions in the usual manner. A central passage 52 (FIGS. 2 and 3) communicates with chamber 42 for purposes as will be described. A shuttle valve comprising a ball 54 is disposed in chamber 42 and is movable to seat against annular shoulders 56 formed at opposite ends of chamber 42. Accordingly, pressure fluid provided through either port 40 or 41 or ports 46 or 47 simultaneously flows through respective passages 48 or 49 to motor M and through passage 52, ball 54 seating against the opposite shoulder 56 in chamber 42 to preclude fluid communication between passages 44 and 45 as pressure fluid is provided either the motor forward or reverse drive ports. An annular chamber 58 is formed about motor M and communicates with a pivotally mounted fluid exhaust nozzle 60 mounted to one side of power tool 10.

Planetary gears 62 are pivotally mounted on the sleeve portion 64 of an intermediate drive member 65 as by pins 66. Sleeve portion 64 is open at one end and receives the geared end 36 of shaft 26, planetary gears 62 meshing therewith. Drive member 65 rotates within a cylindrical chamber 67 having gear teeth 68 along the inner face thereof for meshing engagement with planetary gears 62. The open end of sleeve portion 64 has an end skirt 69 mounting the inner race of bearings 70. The opposite end of sleeve portion 64 mounts a stub shaft 72 having gear teeth 78 meshing with planetary gears 80. Planetary gears 80 are pivotally mounted as by pins 82 in the diametrically enlarged end portion of a sleeve 84. Sleeve 84 mounts the inner race of a bearing 86 between a retaining ring 88 which butts a shoulder 90 on sleeve 84 and a collar 92 which butts an opposite end retaining ring 94 seated about sleeve 84. The reduced diameter opposite end of sleeve 84 is rotatably mounted on suitable needle bearings 96. Planetary gear 80 meshes with geared stub shaft 72 of intermediate drive member 65 and with gear teeth 68 on the inner face of chamber 67 whereby sleeve 84 is rotated at a reduced speed.

The reduced diameter inner end portion 98 of shaft 16 is received within sleeve 84 and a bolt 100 passes through a washer 102 and threads into the end of shaft 98. A diametrically enlarged flange 103 is formed about shaft 16 intermediate the ends thereof and butts the end of sleeve 84. Bolt 100 butts washer 102 against a shoulder 104 on sleeve 84 and butts flange 103 against the end of sleeve 84, thereby retaining reduced diameter portion 98 within sleeve 84. Shaft 16 is splined to sleeve 84 as at 105 whereby motor M drives shaft 16 through reduction gearing R. A gear 108 is keyed to shaft 16 for rotation therewith, gear 108 having a skirt portion 110 mounting shaft 16 and gear 108 for rotation in housing 14 on needle bearings 112. A suitable cap 114 is provided to close the opposite end of housing 14.

A centrally apertured gear 116, having axial sleeve extensions 118 on opposite sides thereof, is mounted within a chamber 120 within upper section 12 as by radial and axial needle bearings 122 and 124, respectively. Gear 116 meshes with gear 108 for rotation therewith and the inner face of gear 116 has splined teeth 126. Spindle 18 is mounted within an elongated cylindrical chamber 130 formed in upper section 12 and has splined teeth 132 extending coextensively therewith for meshing engagement with splined teeth 126 on gear 116, whereby spindle 18 is free for axial sliding movement but must rotate with gear 116. The end of spindle 18 is formed to provide a square end 134 for attachment of a wide variety of suitable work heads, not shown.

An elongated piston 20 is slidably mounted through an end retaining plug 136 having a central opening 137 and secured to the end of section 12 as by bolts 138 with opening 137 in axial registry with chamber 130. A radial flange 139 projects inwardly into opening 137 intermediate the ends of plug 136 and a bushing 140 is disposed within plug 136 outwardly of flange 139. The opening 137 is diametrically enlarged with respect to the diameter of chamber 130, flange 139 and bushing 140.

The left hand end of piston 20 as seen in FIG. 2 is diametrically enlarged to form a piston head 141 which slides within chamber 30. The rear annular face of piston head 141 forms a shoulder 142 butting the inner face of flange 139 thereby limiting axial displacement of piston 20 to the right as seen in FIG. 2. Suitable O-ring seals 144 are carried by piston head 141. The inner end of the piston head is recessed as at 146 and mounts the outer race of a suitable thrust bearing 148 which is retained therein against shoulder 150 by retaining ring 152. The inner end of spindle 18 is diametrically stepped inwardly and the inner race of thrust bearing 148 is clamped against a shoulder 154 thereof by a suitable retaining ring 156. A coil spring 158 encircles spindle 18 and bears at one end against the annular end face 160 of piston head 141. The opposite end of spring 158 butts a retaining ring 162 fixed against a shoulder 164 of upper section 12. Spring 158 maintains piston shaft 20 and spindle 18 in the illustrated retracted position with piston head 141 butting flange 139.

Fluid passage 52 supplies pressure fluid from ports 40, 41, 46 or 47 as the case may be into an annular chamber 166 formed by the side faces of piston head 141 and opening 137 inwardly of flange 139 via a passage 167. Pressure in chamber 166 acts against annular piston face 142 to axially displace piston 20 and spindle 18 to the left as seen in FIG. 2 against the bias of spring 158.

In use, pressure fluid is introduced from a suitable pressure fluid source, not shown, at ports 40 (46) or 41 (47), depending on the direction of rotation desired, through either of the appropriate three-way valves 3V or the four-way valves 4V illustrated in FIGS. 4A and 4B, respectively. The pressure fluid feeds forwardly to fluid motor M via the passages, not shown, to rotate stub shaft 26 in a corresponding direction. The ball 54 (FIG. 3) is displaced by pressure fluid flowing into chamber 42 via passage 44 or 45 to seat against the end annular surface 56 in chamber 42 located opposite to the supply passage 44 or 45 from which pressure fluid issues to prevent exhausting the input pressure fluid through the opposite passage 44 or 45 and to permit the input pressure fluid to flow into passage 52. Stub shaft 26 drives intermediate member 65 with the splined teeth thereof driving shaft 16 through planetary gears 80. Gear 108 rotates with shaft 16 and drives gear 116 whereby spindle 18 is rotatably driven by motor M. Concurrently therewith, pressure fluid is introduced into chamber 166 via passage 52 and drives piston 20 and spindle 18 axially to the left as seen in FIG. 2 against the bias of spring 158, spindle 18 rotating relative to piston 20 on thrust bearing 148. The work head connected to end 134 feeds forwardly into engagement against a fastener, not shown, driving the fastener to final securement, at which time motor M stalls. After the driving cycle is completed, the three-way or four-way valve previously employed is shifted to cut off the supply pressure fluid and provide an exhaust passage from chamber 166 via passages 167, 52, and 44 or 45 as the case may be. Spring 158 then drives spindle 18 to the illustrated retracted position to butt piston head 141 against the inner face of flange 139 as illustrated in FIG. 2.

Figure 6:
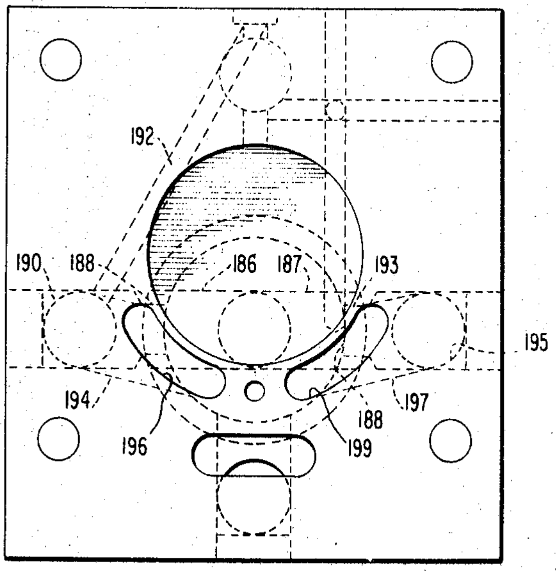
FIG. 6 is a transverse sectional view taken about on line 6—6 of FIG. 5.
Figure 5:
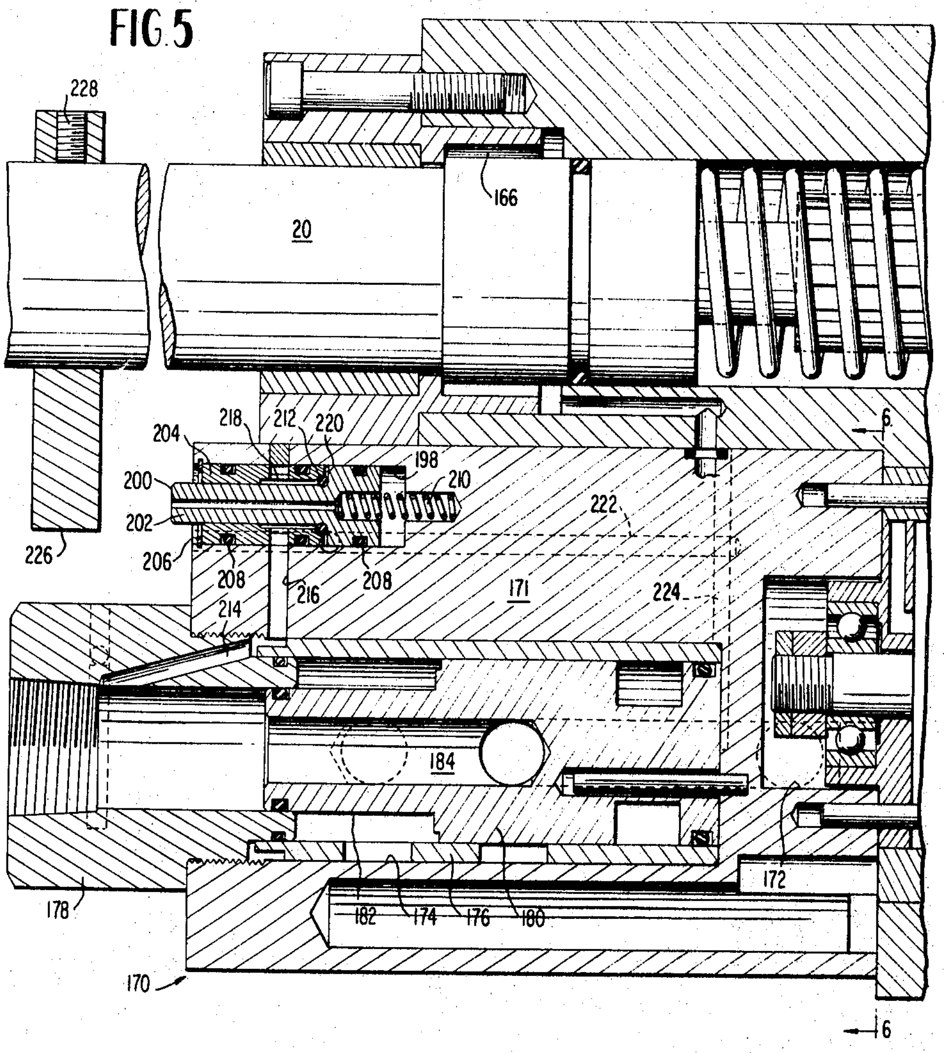
FIG. 5 is an enlarged fragmentary longitudinal sectional view of a modification hereof.
Figure 8:
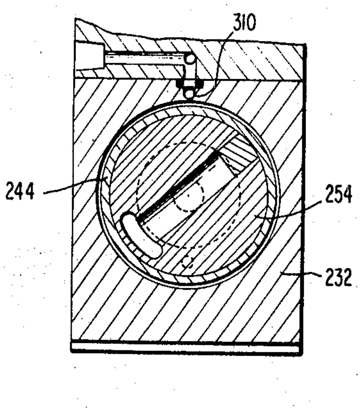
FIG. 8 is a fragmentary cross sectional view thereof taken about on line 8—8 of FIG. 7.

Referring now to the embodiment illustrated in FIGS. 5 and 6, a reversing valve is provided whereby motor M is driven in a reverse direction and pressure fluid to piston 20 is cut off, both occurring in response to a predetermined axial displacement of spindle 18. End block 39 is removed and the reversing valve, generally indicated at 170, is suitably secured in its place. Valve 170 comprises a mounting block 171 having a recess 172 formed through one end for receiving an end shaft mounting for motor M. A cylindrical bore 174 is formed in block 171 and opens through the opposite end thereof. An elongated bushing 176 is disposed in bore 174 which threadably receives a centrally bored end plug 178. A piston 180 is slidably received within bushing 176 and has a reduced diameter end portion 182 slidable within the aperture of plug member 178. Piston member 180 has a cylindrical bore 184 opening through an end thereof in registry with the opening through plug 178 and terminating at its inner end in a pair of laterally opening ports 186 and 187. When piston member 180 is fully advanced as illustrated in FIG. 5, port 186 registers with a lateral passage 188 opening into lateral chamber 190 (FIG. 6). A passage 192 connects with passage 167 in upper section 12 thereby providing fluid communication between chamber 190 and annular chamber 166. A passage 194 extends forwardly to connect between chamber 190 and motor M through a suitable opening 196 in block 171. As seen in FIG. 6, a lateral passage 193 opens into a lateral chamber 195 and a passage 197 extends forwardly to connect between chamber 195 and motor M through a suitable opening 199 in block 171. With piston member 180 located as illustrated, passage 193 is blocked by portion 182 and pressure fluid provided through the opening in plug member 178 into bore 184, flows through port 186, passage 188, and chamber 190 for delivery to motor M via passage 194 and to chamber 166 via passages 192 and 167, whereby motor M rotates spindle 18 and piston 20 feeds spindle 18 forwardly as before.

A second cylindrical bore 198 is formed in block 171 and slidably mounts a piston member 200. The stem 202 of piston member 200 extends outwardly through a bushing 204 retained in bore 198 by a clamping ring 206, suitable O-ring seals 208 being provided both bushing 204 and piston member 200. A coil spring 210 engages within a recess at one end of piston member 200 and engages against a recess formed in the base of bore 198 whereby piston member 200 is biased axially outwardly. An O-ring seal 212 carried on the annular face of piston member 200 engages against a seat formed on the inner end of bushing 204 to prevent fluid communication between opposite sides of piston member 200.

Plug member 178 has a passage 214 registering with a passage 216 formed in block 171 opening into an annular chamber 218 outwardly of seal 212 between bushing 204 and stem 202 through a suitable aperture in bushing 204. An annular chamber 220 is formed between the annular faces of piston member 200 and bushing 204 on the opposite side of seal 212. A passage 222 communicates between chamber 220 and a passage 224 which opens against the inner face of piston member 180. As seen in FIG. 5, piston stem 202 projects beyond the end face of block 171 into the path of movement of a stop ring 226 carried on piston 20. Stop ring 226 is adjustably mounted at selected axial positions along the rod of piston 20 by a set screw 228. Accordingly, it can be seen that by selectively locating stop ring 226 a predetermined distance from piston stem 202, the forward travel of piston 20 can be limited to provide a predetermined axial displacement of spindle 18. Abutment of stop ring 226 against stem 202 axially displaces piston member 200 to the right as seen in FIG. 5 to provide pressure fluid against the end of piston member 180 via passages 214, 216, past O-ring seal 212 into chamber 220, and passages 222 and 224. Axial displacement of piston member 180 to the left as seen in FIG. 5 in response to the pressure fluid against the piston face thereof, causes port 187 to register with passage 193 and the side face of piston member 180 to block port 186, thereby precluding further flow of pressure fluid into motor M and annular chamber 166.

Registry of port 187 with passage 193 provides pressure fluid through the opening in plug 178 into chamber 195 via passage 193 and through passage 197 to motor M to reverse the direction of rotation thereof and hence the direction of rotation of spindle 18. With piston member 180 displaced to the left as seen in FIG. 5, the wall thereof blocks port 186 thereby also cutting off the flow of pressure fluid to chamber 166 whereby spindle 18 retracts under the bias of spring 158.

Referring now to the embodiment illustrated in FIGS. 7 through 10, a modified motor mounting is provided including a means for detecting that the motor torque has exceeded a predetermined value. In this form, reduction gearing R, spindle 18, and piston 20 are constructed similarly as in the previous embodiments. Lower housing section 14 comprises a casing 230 and a cup-shaped end mounting block 232, suitable secured to the underside of upper housing section 12. The base or outer end of block 232 is centrally apertured and threaded as at 234 and one end of a sleeve 236 threads thereabout. The opposite end of sleeve 236 mounts the inner race of a bearing 238, the outer race of which is mounted along the inner face of a collar 240 by retaining ring 242. Collar 240 threadedly engages within one end of sleeve 244, the opposite end of which is rotatably mounted on needle bearings 246 carried by mounting member 248 fixed to casing 230. An inwardly extending radial flange 250 is formed on the end of sleeve 244, the outer annular face of which bears against needle bearings 252 engaging member 248. A cup-shaped member 254, having a nipple 256 extending axially within sleeve 236, butts the inner face of collar 240. An end closure member 258 for motor M butts the inner annular face of cup member 254 and mounts ball bearings 30 which rotatably mount one end of shaft 26 of motor M. An end closure plate 260 butts the inner face of flange 250 and mounts bearings 30 which rotatably mounts the opposite end of shaft 26, the latter driving reduction gearing R via gear teeth 36. End closure plates 258 and 260 are fixed to the motor housing 262 as by pins 264 which extend into the cup-shaped member 254 and flange 250, respectively. A threaded inlet port 266 is formed through the end face of block 232 and communicates through sleeve 236, nipple 256, and a suitable passage 268 formed in cup-shaped member 254 to provide pressure fluid to motor M. It will be seen that the gear friction in reduction gearing R would normally cause motor M to drive its outer motor casing comprising end closure members 258 and 260, collar 240 and sleeve 244 about bearings 238, 246, 256, and 30 in an opposite direction. Rotation of the outer motor casing, however, is restrained by the abutment of a screw 270 threaded into the outer face of collar 240 against a torque detecting device, generally indicated 272.

The lower portion of block 232 has a bore therethrough forming a chamber 274 into which is secured a cylindrical plug 276 as by screws, not shown, threading through the rectangular end nipple portion 278 of plug 276. The inner end of plug 276 is recessed as at 280. A block member 282 is mounted within recess 280 for pivotal movement about a pin 284 extending into the upper and lower walls of plug member 276.

Figure 10:
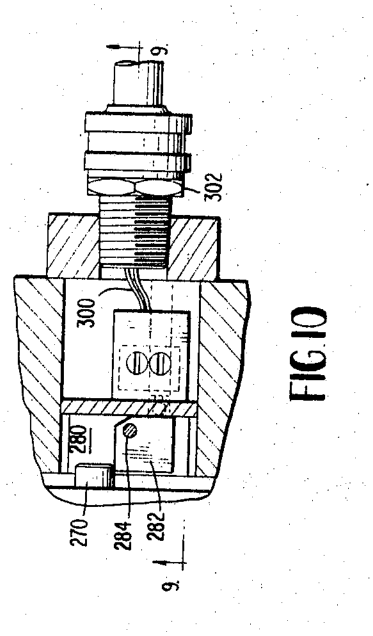
FIG. 10 is an enlarged fragmentary cross sectional view of the switch means taken about on line 10—10 of FIG. 9.
Figure 9:
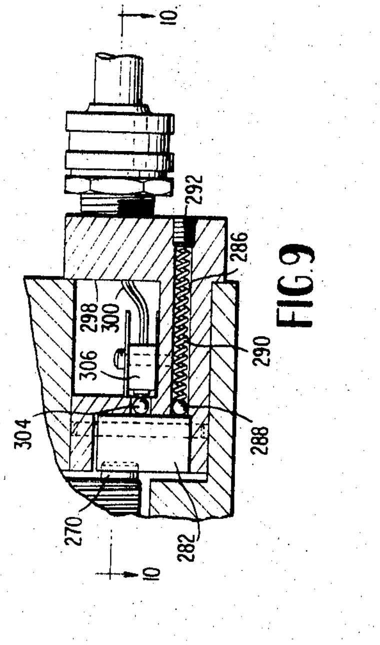
FIG. 9 is an enlarged fragmentary view of the switch means employed with the modification shown in FIG. 7 and taken about on line 9—9 of FIG. 10.

As seen in FIG. 9, a bore 286 is formed longitudinally through plug 276 and opens into recess 280, bore 286 being laterally offset from the pivotal axis of pin 284. A ball 288 is biased as by spring 290 to bear against the inner face of block 282, the opposite end of spring 286 butting an end set screw 292 whereby the biasing force of ball 288 against block 282 may be preset. As best seen in FIG. 10, spring 286 exerts a thrust on block 282 tending to rotate it about pin 284 in a clockwise direction. The torque reaction of the outer motor housing is passed to black 282 through screw 270 which tends to rotate block 282 about pin 284 in a counterclockwise direction and against the bias of spring 286. A switch 306, preferably of the single pole, double throw type, is mounted within a recess 298 formed intermediate the ends of plug 276, the electrical leads 300 for switch 306 extending through a connector 302 which threads into the outer end of plug 276. Switch 306 is actuated by inward movement of a ball 304 toward switch 306, ball 304 being carried in an aperture connecting chamber 298 with recess 280 whereby ball 304 projects slightly into recess 280. It will be seen that when the motor torque reaction of the outer motor housing which tends to pivot block 282 counterclockwise as seen in FIG. 10 exceeds the predetermined loading on spring 290, which tends to pivot block 282 clockwise, the torque reaction overcomes the spring loading and pivots block 282 counterclockwise to displace ball 304 toward switch 306 thereby actuating the same. By selectively threading set screw 292, the magnitude of the biasing force of spring 290 tending to rotate block 282 clockwise, may be adjusted to a predetermined magnitude.

Figure 7:
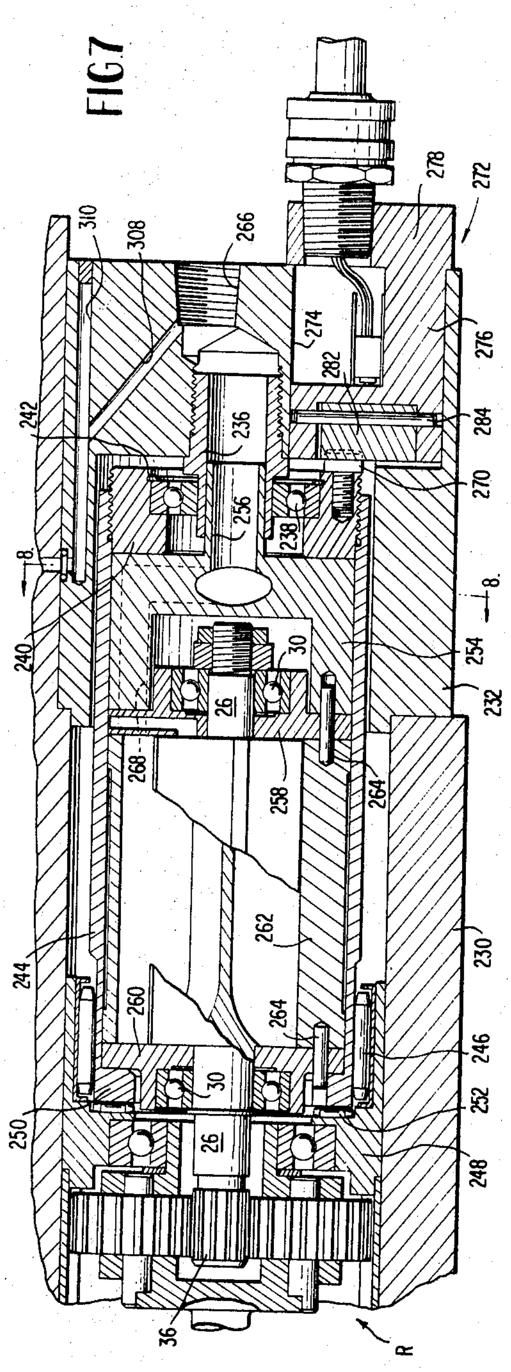
FIG. 7 is an enlarged longitudinal sectional view of a further modification hereof.

As seen in FIG. 7, the passage 308 connects between port 266 and a longitudinal passage 310 which opens into annular chamber 166 via passage 167 as in the previous embodiments. Pressure fluid supplied through port 266 and through sleeves 236, nipple 256 and passage 268 drives motor M, the outer casing thereof being restrained from rotation by the engagement of screw 270 against block 282 whereby motor M drives reduction gearing R through shaft 16 to drive spindle 18 in rotation as before and for reaction torque magnitudes below a predetermined magnitude. Concurrently, pressure fluid is supplied behind piston head 141 via passages 308, 310 and chamber 166 to drive piston 20 and spindle 18 axially as before. It will be seen that when the resistance to rotation of spindle 18 caused by the engagement of a work tool connected thereto with a workpiece exceeds the predetermined torque, the torque reaction of the outer casing of motor M drives screw 270 against block 282 with sufficient force to overcome the preloaded force of spring 290, causing block 282 to displace ball 304 toward switch 306, thereby actuating switch 306. Actuation of switch 306 provides a signal indicating the delivered torque through spindle 18 has exceeded a predetermined value. The switch 306 may be connected in controlling relation to fluid supply valves, indicator lamps, etc., or other functions, as desired.

Figure 11:
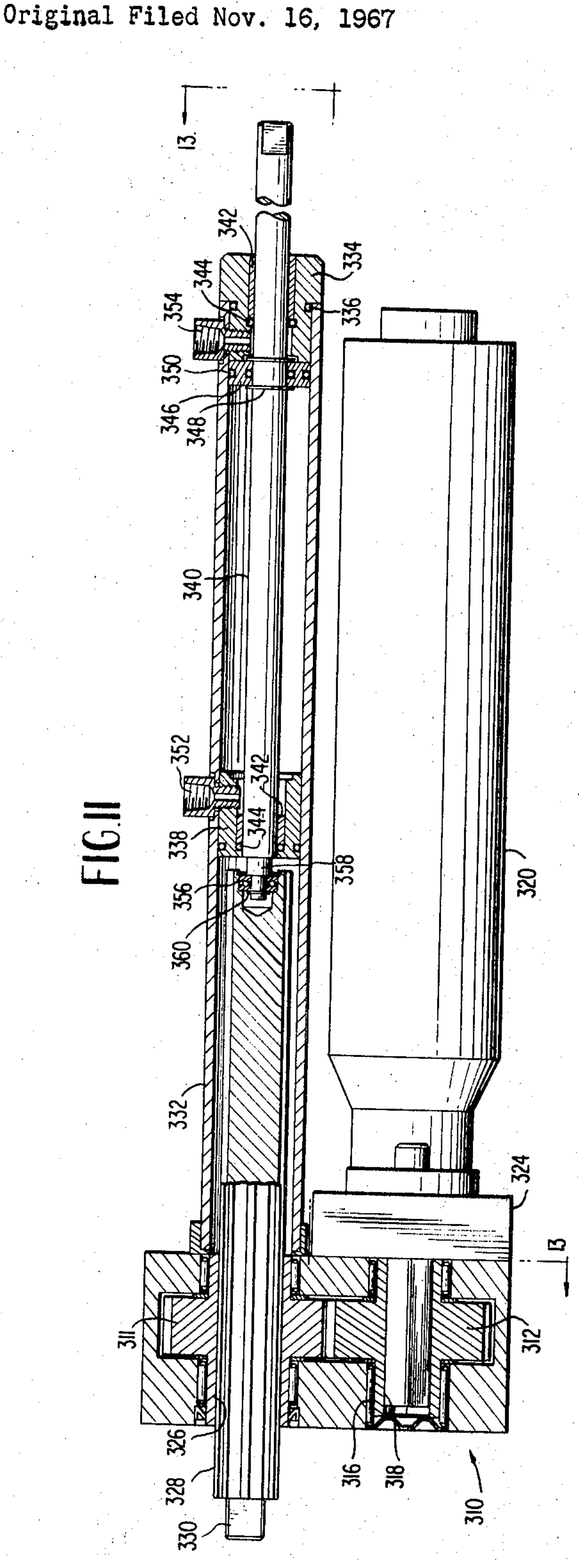
FIG. 11 is a longitudinal sectional view of another form of a power tool hereof.
Figure 13:
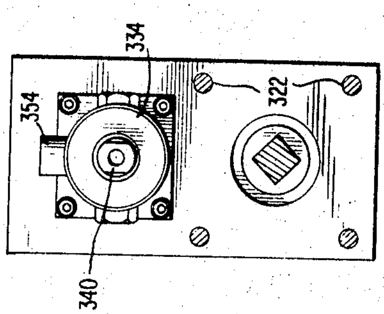
FIG. 13 is an end elevational view thereof taken about on line 13—13 of FIG. 11.
Figure 12:
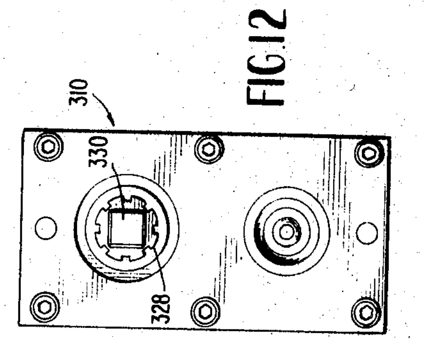
FIG. 12 is an end elevational view looking from left to right in FIG. 11.
Figure 16:
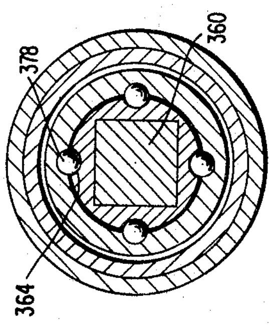
FIG. 16 is a cross sectional view thereof taken about on line 16—16 of FIG. 14.
Figure 17:
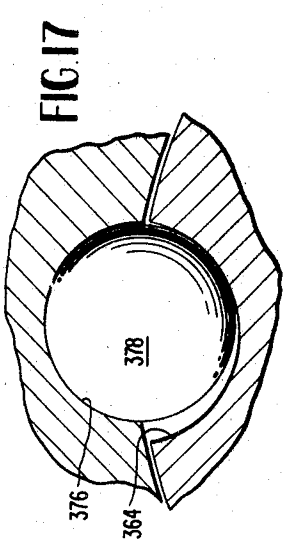
FIG. 17 is an enlarged fragmentary cross sectional view of the roller bearing gear-sleeve connection shown in FIG. 16.

In the embodiment of the invention illustrated in FIGS. 11 through 13, the power tool is formed such that various fluid motors may be employed interchangeably therewith. To this end, a tool head 310 mounts a pair of gears 312 and 314 on needle bearing 316, gears 312 and 314 being in meshing engagement one with the other. Gear 312 has an axial passage 318 extending therethrough having a cross section in the form of a square for receiving the squared end of the driving member of a power motor indicated at 320. The rear face of head 310 is suitably bored as at 322 (FIG. 13) to receive an adapter plate 324 suitably mounted on the work end of motor 320 whereby motor 320 can be readily and easily secured to head 310 as by the threading of bolts, not shown, into bores 322. Fluid motor 320 may be of any suitable fluid actuated motor type, either pneumatic or hydraulic, and may be an electric motor if desired.

Gear 314 has an axial passage 326 therethrough which is splined for connection with a spindle 328 mounting a work tool engaging head 330 on its end whereby spindle 328 is free for axial sliding movement along passage 326 in gear 314 but must rotate therewith. An elongated cylindrical housing 332 is suitably fixed to the rear face of head 310 in axial registry with passage 326. An end closure member 334 seals the opposite end of housing 332 and is provided with suitable O-ring seals 336. A bearing member 338 is mounted medially the ends of housing 332. End closure member 334 and bearing member 338 are axially bored to receive a piston rod 340 mounted on suitable bushings 342 and O-rings 344 thereof. A piston ring or head 346 is fixed on piston rod 340 as by retaining clamps 348 and is provided with the usual O-ring seal 350. A pair of ports 352 and 354 are mounted at opposite ends of the chamber within housing 332 formed by members 338 and 334. The inner end of spindle 328 is recessed and mounts the outer race of a bearing 356, the inner race of the bearing 356 being mounted on a diametrically reduced stepped end portion 358 of piston rod 340 and retained thereon by a retaining ring 360. It will be seen that by selectively supplying pressure fluid to ports 352 and 354, piston rod 340 and spindle 328 are caused to reciprocate as a unit longitudinally of housing 332.

In use, a selected motor 320 is clamped to the rear face of head 310 with the squared end thereof engaging in square passage 318 of gear 312 whereby actuation of motor 320 rotates gear 312. Gear 314 rotates with gear 312 whereby spindle 328 is caused to rotate relative to piston rod 340. Application of pressure fluid to port 354 drives piston rod 340 and spindle 328 axially to the left as seen in FIG. 11, fluid on the opposite side piston ring 346 exhausting through port 352. In this manner, head 330 feeds forwardly in rotation whereby the tool mounted thereon engages a fastener, not shown, to drive the same. When the fastener is finally secured, pressure fluid is cut off from port 354 and applied at port 352 to retract piston rod 340 whereby spindle 328 is retracted therewith away from the work. It will be noted that in this form, the motor 320 is driven by a power source independent of the pressure fluid applied to ports 352 and 354 which feeds the spindle forwardly. This embodiment therefor provides a power tool which may be driven by any number of suitable motors while simultaneously affording the advantages of feeding the work tool forwardly in rotation for engagement with the work.

In the form of the invention illustrated in FIGS. 14 through 17, the driven gear to spindle connection is formed such that the spindle is free for substantially frictionless axial movement at high torques, particularly when the workhead engages the work. To this end, the feed spindle 360, which is suitably attached by means, not shown, at its inner end to a piston similar to the pistons shown in the previous embodiments, is square in cross section and engages through a sleeve 362 having a complementary square bore. It will be noted, in this connection, that spindle 360 need not be square but can have as in the previous forms, a spline connection or any other connection with sleeve 362 providing for axial movement of spindle 360 relative to sleeve 362. A plurality of circumferentially spaced axially extending grooves 364 are formed about the cylindrical outer face of sleeve 362. A retaining ring 366 is mounted about the forward end of sleeve 362 forming an end stop in grooves 364. Sleeve 362 is slidably received within the reduced diameter bore portion 368 of a gear 370 which is suitably mounted on needle bearings 372 in the forward portion of the tool head 374. The reduced diameter bore portion 368 of gear 370 is axially grooved as at 376 at like circumferential positions thereabout as the grooves 364 are formed in sleeve 362 whereby grooves 364 and 376 may be aligned in radial registry. A plurality of roller bearings 378 are carried in the complementary grooves 364 and 376 whereby sleeve 362 is free for axial movement relative to gear 370 but must rotate therewith. The inner end of gear 370 mounts a retaining ring 380 whereby roller bearings 378 are confined within grooves 364 and 376 between retaining rings 366 and 380.

The opposite end of gear 370 mounts a retaining ring 382 against which butts one end of a coil spring 384. The opposite end of spring 384 butts the forward annular end face of sleeve 362 whereby sleeve 362 is normally maintained in an axially retracted position with retaining ring 366 limiting inward axial movement thereof by butting roller bearings 378 against the retaining ring 380 on gear 370. It will be noted that spindle 360 is free for axial movement relative to sleeve 362 and that sleeve 362 is free for axial movement relative to gear 370 but that both spindle 360 and sleeve 362 must rotate with gear 370 through the roller bearing connection between gear 370 and sleeve 362 and the square (or splined) connection between sleeve 362 and spindle 370.

The lower portion of tool head 374 mounts a gear 386 having a square bore for receiving the square end of a driven member 388 of a fluid actuated motor indicated at 390. Motor 390 is suitably mounted to the lower inner face of tool head 374 through an adapter plate 392 by means not shown. Tool head 374 rotatably mounts an intermediate gear 394 which meshes with gears 386 and 370 whereby spindle 360 is rotated in the same direction as motor 390 rotates member 388 through the drive connection described previously.

Figure 14:
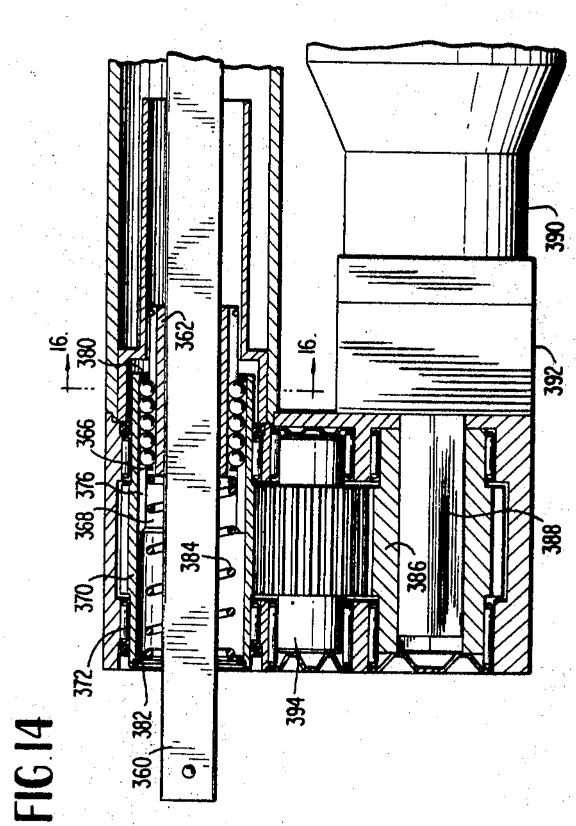
FIG. 14 is a fragmentary longitudinal sectional view of still another form of the power tool hereof and illustrating the spindle in a retracted position.

In use, pressure fluid is provided motor 390 by means, not shown, whereby the latter drives gears 386, 394, and 370 and causes spindle 360 to rotate through the roller bearing connection between gear 370 and sleeve 362 and the square (or splined) connection between sleeve 362 and spindle 360. When pressure fluid is applied to the piston, not shown, similarly as in the previous embodiments, spindle 360 feeds axially forward through the square hole in sleeve 362 which is held against axial displacement by spring 384. Spindle 360 continues to advance as before until it meets resistance to rotation as when it engages the work. As torque develops on the work, friction between spindle 360 and the sides of the square opening in sleeve 362 increases rapidly, to the point where axial displacement of spindle 360 relative to sleeve 362 is prevented and spindle 360 frictionally locks with sleeve 362. At this point, sleeve 362 and spindle 360 are displaced axially to the left as a unit as seen in FIG. 14, rolling substantially friction free on bearings 378. Thus, it is seen that, while spindle 360 is prevented from axial sliding movement through the square hole in sleeve 362 by the increased friction therebetween generated by high torque loads, the unitary axial displacement of spindle 360 and sleeve 362 is substantially friction free at such relatively high torque loads.

Figure 15:
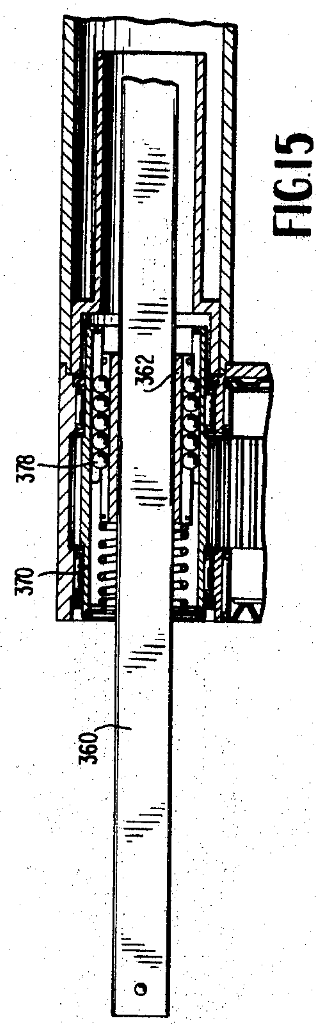
FIG. 15 is a view similar to FIG. 14 illustrating the spindle in an extended work engaging position.

Should the resistance to rotation be only momentary, so that the torque load drops to a low value, spring 384 drives sleeve 362 to the right, as seen in FIG. 15, back to its initial position with roller bearings 378 clamped between retaining rings 366 and 380. Should the torque, however, remain at a high value, sleeve 362 would continue to move axially with spindle 360 until the work or fastener is finally secured. In most applications, the fastener or hole to be tapped requires less than 1½ inches of axial movement of the tool mounted on the end of spindle 360. Accordingly, in the preferred form, sleeve 362 and the reduced diameter portion 368 of gear 370 are formed to permit at least 1½ inches of axial displacement of sleeve 362. It is thus seen that the substantially friction free axial feed in this form is provided only when needed as when the torque load is of such value as to inhibit or prevent axial displacement of spindle 360 relative to sleeve 362 by high friction therebetween. Moreover, the substantially friction free advance of the spindle is automatically provided without external adjustment in response to frictional locking between the spindle and sleeve and automatically reset, when the friction between the spindle and sleeve is not sufficiently great as to prevent or substantially retard axial displacement of the spindle relative to the sleeve. The substantially friction free axial feed of this embodiment may be employed in conjunction with any of the previous embodiments.

It is thus seen that the objects of the invention are fully accomplished in that there is provided a power tool for driving fasteners, tapping holes and the like, which is dependable, inexpensive, and rugged in use. Moreover, the tool is particularly adapted for production line assembly since the power tool per se may be fixedly mounted while the workhead thereof feeds forwardly in rotation to engage the work. Various embodiments of the power tool hereof have been illustrated and described and it is thus seen that the power tool hereof may be adapted to wide and various applications.

What is claimed and desired to be secured by United States Letters Patent is:

1. A power tool comprising a housing, a spindle having an end portion for mounting a workhead, means mounting said spindle in said housing for rotary and axial movement, said mounting means including a first member carrying said spindle for axial sliding movement relative to said housing for torque loads on said spindle below a predetermined torque load, said mounting means including a second member carrying said spindle for substantially friction free axial movement relative to said housing for torque loads on said spindle greater than or equal to said predetermined torque load, means for axially displacing said spindle to advance said workhead away from said housing, and a motor drivingly connected to said spindle for rotating the latter simultaneously as said spindle is displaced axially.

2. A tool according to claim 1 wherein said motor is fluid actuated and means providing pressure fluid to said motor for rotating said spindle, said motor being releasably secured to said housing.

3. A tool according to claim 1 including means for retaining said first member in a first axial position relative to said second member for torque loads below said predetermined torque load, said first member being axially movable relative to said second member into a second axial position for torque loads on said spindle greater than or equal to said predetermined torque load.

4. A power tool according to claim 3 including roller bearings disposed between said first and second members providing for axial movement of said first member relative to said second member at torque loads greater than or equal to said predetermined torque load.

5. A power tool according to claim 1 wherein said first member comprises a sleeve receiving said spindle, said second member having an opening for receiving said spindle and said sleeve, roller means between said sleeve and said second member providing for axial movement of said spindle and sleeve relative to said housing at torque loads greater than or equal to said predetermined torque load, spring means biasing said sleeve to an initial retracted position, said spindle being axially displaceable relative to said sleeve at torque loads below said predetermined torque load with said sleeve and spindle being axially displaced as a unit against the bias of said spring means and along said roller means in response to frictional locking between said sleeve and spindle at torque loads greater than or equal to said predetermined torque load.

6. A power tool according to claim 1 wherein said spindle displacing means includes a fluid actuated piston and cylinder.

7. A power tool according to claim 1 wherein said first member includes a sleeve encompassing said spindle for rotation therewith, said second member including a gear having an opening with said sleeve and spindle being carried by said gear in said opening, said motor being drivingly connected to said gear, and means engaging between said gear and said sleeve mounting said sleeve for rotation with said gear and said sleeve and spindle for substantially friction free axial displacement relative to said gear for torque loads greater than or equal to said predetermined torque load.

8. A power tool according to claim 7 wherein said spindle is axially slidable relative to said sleeve, said spindle being axially slidable relative to said sleeve with said sleeve and spindle being jointly axially displaceable in response to frictional locking between said sleeve and spindle at torque loads greater than or equal to a predetermined torque load.

9. A power tool comprising a housing, a spindle having an end portion for mounting a workhead, means mounting said spindle in said housing for rotary and axial movement, said mounting means including a first member carrying said spindle for axial sliding movement relative to said housing in response to torque loads on said spindle below a predetermined torque load, said mounting means including a second member carrying said spindle for substantially friction free axial movement relative to said housing in response to torque loads on said spindle greater than or equal to said predetermined torque load, a motor drivingly connected to said spindle for rotating the latter, fluid actuated means connected to said spindle for axially displacing the latter, means for providing pressure fluid to said fluid actuated means to axially displace said spindle to advance the workhead away from said housing, and roller hearings disposed between said first and second members providing for axial movement of said first member relative to said second member at torque loads greater than or equal to said predetermined torque load.

10. A tool according to claim 9 including means for retaining said first member in a first axial position relative to said second member for torque loads below said predetermined torque load, said first member being axially movable relative to said second member into a second axial position in response to torque loads on said spindle greater than or equal to said predetermined torque load.

11. A power tool comprising a housing, a spindle having an end portion for mounting a work head, means mounting said spindle in said housing for rotary and axial movement, a fluid-actuated motor drivingly connected to said spindle for rotating the latter, fluid actuated means connected to said spindle for axially displacing the latter, means for providing pressure fluid to said fluid motor and said fluid actuated means to respectively rotate and axially displace said spindle to advance the work head away from said housing, said mounting means including a gear having an opening, said fluid motor being drivingly connected with said gear, a sleeve encompassing said spindle with said sleeve and spindle being disposed in said gear opening, said sleeve carrying said spindle for rotation therewith, means engaging between said gear and said sleeve mounting said sleeve for rotation with said gear and said sleeve and spindle for substantially friction free axial displacement relative to said gear.

12. A tool according to claim 11 wherein the outer surface of said sleeve has a plurality of circumferentially spaced axially extending grooves, the inner surface of said gear defining said opening having similarly circumferentially spaced axially extending grooves wherein the grooves carried by said gear and said sleeve lie in substantial radial registry, said engaging means between said gear and said sleeve including a plurality of balls carried in said grooves.

13. A tool according to claim 11 wherein said spindle is axially movable relative to said sleeve, and means biasing said sleeve to an initial retracted position.

14. A tool according to claim 11 wherein said spindle is axially slidable relative to said sleeve, said spindle being axially slidable relative to said sleeve with said sleeve and spindle being jointly axially displaceable in response to frictional locking between said sleeve and spindle at torque loads greater than or equal to a predetermined torque load.

15. A tool according to claim 14 wherein said engaging means between said gear and said sleeve includes a plurality of ball bearings.

16. A tool according to claim 15 wherein said spindle is substantially polygonally shaped in cross section, said sleeve including an opening having a similarly polygonally shaped cross section for receiving said spindle.

17. A tool according to claim 14 including means for biasing said sleeve into an initially retracted position.

18. A tool according to claim 6 wherein said fluid actuated motor is releasably secured to said housing.

19. A power tool comprising a housing, a spindle having an end portion for mounting a workhead, means mounting said spindle in said housing for rotary and axial movement, said mounting means including a first member carrying said spindle for axial sliding movement relative to said housing in response to torque loads on said spindle below a predetermined torque load, said mounting means including a second member carrying said spindle for substantially friction free axial movement relative to said housing in response to torque loads on said spindle greater than or equal to said predetermined torque load, a motor drivingly connected to said spindle for rotating the latter, fluid actuated means connected to said spindle for axially displacing the latter, means for providing pressure fluid to said fluid actuated means to axially displace said spindle to advance the workhead away from said housing, said first member including a sleeve receiving said spindle, said second member having an opening for receiving said spindle and said sleeve, roller means between said sleeve and said second member providing for axial movement of said spindle and sleeve relative to said housing at torque loads greater than or equal to said predetermined torque load, spring means biasing said sleeve to an initial retracted position, said spindle being axially displaceable relative to said sleeve at torque loads below said predetermined torque load with said sleeve and spindle being axially displaced as a unit against the bias of said spring means and along said roller means in response to frictional locking between said sleeve and spindle at torque loads greater than or equal to said predetermined torque load.

References Cited

UNITED STATES PATENTS

| | | | |
|---|---|---|---|
| 1,259,852 | 3/1918 | Greve | 64—23.5 |
| 1,897,434 | 2/1933 | Loeber et al. | 173—148 |
| 3,323,395 | 6/1967 | Burnett et al. | 173—12 X |
| 3,364,699 | 1/1968 | Hufsedler et al. | 64—23.5 |

ERNEST R. PURSER, Primary Examiner

U.S. Cl. X.R.

64—23.7; 173—12